(12) United States Patent
Bolton et al.

(10) Patent No.: US 7,080,511 B1
(45) Date of Patent: Jul. 25, 2006

(54) METHOD FOR CONTROLLING ENGINE AIR/FUEL RATIO

(75) Inventors: Brian Kenneth Bolton, Birmingham, MI (US); Kevin Dean Sisken, Saline, MI (US); Anne-Lise Grosmougin, Birmingham, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/033,770

(22) Filed: Jan. 12, 2005
(Under 37 CFR 1.47)

(51) Int. Cl.
*F02B 33/44* (2006.01)
*F02B 33/00* (2006.01)
*F01N 5/04* (2006.01)
*F01N 3/00* (2006.01)
*F01N 3/10* (2006.01)

(52) U.S. Cl. .................. 60/611; 123/564; 60/280; 60/295; 60/301

(58) Field of Classification Search ............ 60/611, 60/600–603, 285, 280, 605.2, 295, 301; 123/564
See application file for complete search history.

(56) References Cited

U.S. PATENT DOCUMENTS

| | | | | |
|---|---|---|---|---|
| 4,282,713 A | * | 8/1981 | Antoku et al. ............... | 60/600 |
| 4,489,702 A | * | 12/1984 | Cholvin et al. ............. | 123/564 |
| 4,515,136 A | * | 5/1985 | Cholvin et al. ............. | 123/564 |
| 4,817,387 A | * | 4/1989 | Lashbrook .................... | 60/611 |
| 4,873,961 A |   | 10/1989 | Tanaka | |
| 5,526,645 A | * | 6/1996 | Kaiser ......................... | 60/611 |
| 6,055,967 A | * | 5/2000 | Miyagi et al. .............. | 123/564 |
| 6,327,856 B1 | * | 12/2001 | Iwabuchi et al. ............ | 60/603 |
| 6,378,506 B1 | * | 4/2002 | Suhre et al. ................ | 123/564 |
| 6,675,579 B1 | * | 1/2004 | Yang ........................... | 60/564 |
| 6,681,171 B1 | * | 1/2004 | Rimnac et al. ........ | 123/568.22 |
| 6,701,710 B1 | * | 3/2004 | Ahrens et al. ............... | 60/611 |
| 6,732,507 B1 | * | 5/2004 | Stanglmaier et al. ........ | 60/285 |
| 6,983,597 B1 | * | 1/2006 | Wild et al. ................... | 60/611 |
| 6,988,361 B1 | * | 1/2006 | van Nieuwstadt et al. .... | 60/285 |
| 6,990,814 B1 | * | 1/2006 | Boley et al. ................. | 60/611 |
| 7,010,914 B1 | * | 3/2006 | Roberts et al. .............. | 60/611 |
| 2002/0195086 A1 |   | 12/2002 | Beck et al. | |
| 2003/0000507 A1 | * | 1/2003 | Kobayashi et al. ........ | 60/605.2 |
| 2004/0237509 A1 | * | 12/2004 | Bhargava et al. ............. | 60/280 |
| 2005/0103013 A1 | * | 5/2005 | Brookshire et al. ........ | 60/605.2 |

* cited by examiner

*Primary Examiner*—Thai-Ba Trieu
(74) *Attorney, Agent, or Firm*—Brooks Kushman P.C.

(57) ABSTRACT

A system for controlling engine air/fuel ratio includes an engine, a compressor having an inlet receiving air. The compressor discharges air to the engine intake. A recirculation path is provided from the compressor discharge to the compressor inlet. A controllable valve is located along the recirculation path. A controller is programmed to control the valve to vary the air flow to the engine intake, thereby controlling the air/fuel ratio. Various applications for the compressor recirculation arrangement are possible.

10 Claims, 2 Drawing Sheets

METHOD FOR CONTROLLING ENGINE AIR/FUEL RATIO

STATEMENT REGARDING FEDERALLY SPONSORED RESEARCH OR DEVELOPMENT

This invention was made with Government support under Contract No. DE-FC02-99EE50575. The Government may have certain rights to this invention.

BACKGROUND OF THE INVENTION

1. Field of the Invention

The invention relates to a method for controlling engine air/fuel ratio.

2. Background Art

After-treatment devices such as Lean NOx Traps (LNT) are being devised to adsorb NOx emissions from diesel engines in an effort to meet future emission standards. LNTs can be very effective in trapping NOx but need to be periodically cleaned through a regeneration process. A rich environment (close to an air/fuel ratio of 14) is required to regenerate the trap. While fuel injection in the combustion chamber and/or fuel injection in the exhaust stream can effectively reduce the exhaust air/fuel ratio, they both present some limitations in terms of how much fuel can be injected. Too much fuel injected in the combustion chamber after the main combustion event (late post injection) can result in wall wetting and engine damage or affect the engine torque curve when injected too early. Injecting large quantities of fuel in the exhaust stream could require large and bulky injectors.

For the foregoing reasons, there is a need for an improved method for controlling engine air/fuel ratio.

SUMMARY OF THE INVENTION

It is an object of the invention to provide an improved method for controlling engine air/fuel ratio.

The invention comprehends bringing the air/fuel ratio down to an intermediate level through engine air flow management during the LNT regeneration process. More specifically, in a supercharged or turbocharged engine including a compressor at the intake, recirculating some air from the compressor discharge back to the compressor inlet reduces the engine air/fuel ratio. This approach alleviates much of the requirements on the fuel injection side that are typically associated with LNT regeneration. Further reduction of the air/fuel ratio can be achieved via fuel injection into the combustion chamber and/or fuel injection in the exhaust stream.

Further, in accordance with the invention, this same method of recirculating some air from the compressor discharge back to the compressor inlet to reduce the engine air/fuel ratio can be used to increase the engine's exhaust temperature to promote regeneration of a diesel particulate filter (DPF). For example, if the DPF is full of exhaust particles and requires regeneration, this compressor recirculation can be used to increase the exhaust temperature. The amount of air being recirculated is selected as a function of the required exhaust temperature increase.

Similarly, this approach can be used to increase exhaust temperature for more rapid catalyst light off or move the exhaust temperature to a range where catalyst efficiency is higher.

Further, this approach can be used for optimization of turbocharger operation, by either moving the compressor operation away from the surge line (safety feature), or bringing it to a higher efficiency line (performance feature).

DETAILED DESCRIPTION OF THE PREFERRED EMBODIMENT

Figure 1:
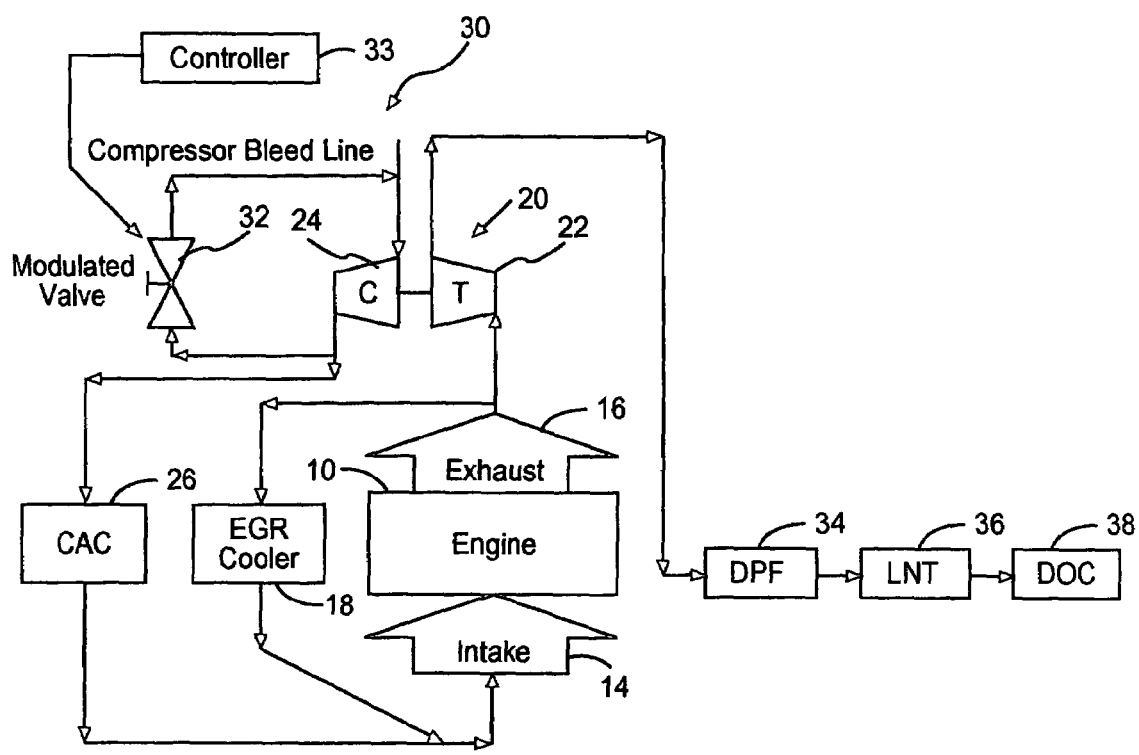
FIG. 1 illustrates modulated compressor recirculation to control engine air/fuel ratio in accordance with a preferred embodiment of the invention.

With reference to FIG. 1, an engine 10 includes a plurality of cylinders fed by fuel injectors. The engine intake is indicated at 14 while the engine exhaust is indicated at 16. In the illustrated preferred embodiment, the engine is equipped with an exhaust gas recirculation (EGR) system. The EGR system recirculates a portion of the exhaust gases back to the engine intake 14, as needed, to avoid excessively high combustion temperatures which cause NOx creation. EGR cooler 18 cools the recirculated exhaust gas prior to introduction at engine intake 14.

As shown, the engine is equipped with a turbocharger system 20. System 20 includes turbine 22 driven by exhaust gases. Turbine 22 drives compressor 24. Charge air cooler (CAC) 26 cools the charge air from compressor 24 prior to introduction at engine intake 14.

According to the invention, engine air flow management is utilized to reduce the engine air/fuel ratio. More specifically, a recirculation path 30 from the compressor discharge to the compressor inlet is provided, and a controllable valve 32 is located along this recirculation path 30. A controller 33 is programmed to modulate controllable valve 32 to vary the airflow to the engine intake 14, thereby varying the air/fuel ratio.

In more detail, a modulated compressor recirculation flow can, for instance, bring the engine air/fuel ratio from 25 down to 17 (arbitrary numbers selected as an example), and then fuel injection strategies may be employed to further lower the exhaust air/fuel ratio from 17 down to 14 where regeneration becomes effective. In FIG. 1, the Lean NOx Trap (LNT) is indicated at 36. The innovative approach of the invention involves recirculating some air flow (charge air) from the compressor outlet back into the compressor inlet. The amount of air available in each cylinder of engine 10 is reduced, resulting in richer fuel combustion in the engine. Exhaust gases reaching LNT 36 are fuel rich and promote the regeneration process. At the end of LNT regeneration, compressor recirculation is disabled, bringing the engine back to lean operating conditions where it runs most effectively.

The invention is applicable to supercharged or turbocharged engines. In the preferred embodiment illustrated in FIG. 1, recirculation path 30 is composed of an external tube introduced between the compressor outlet and the compressor inlet of the turbocharger system 20. The purpose of the tube is to recirculate compressed air from the compressor outlet back into the compressor inlet. The tube (recirculation passage) can also be directly incorporated into the compressor housing. Air will naturally flow from the compressor outlet (high pressure side) into the compressor inlet (low pressure side).

Modulator valve 32 is capable of modulating the air flow, and is installed in the tube, creating a compressor bleed line. The amount of air going through the bypass tube is defined by the size of the tube and the valve position (full open, or modulated). The valve is electronically modulated by controller 33 to provide variable and controllable air/fuel ratio. It is appreciated that controller 33 may be any suitable controller as understood by those of ordinary skill in the art of engine control systems. That is, controller 33 may be the engine controller or a different controller that controls one or more subsystems of the engine.

When regeneration is required at LNT 36 (possibly defined by the NOx conversion rate of the LNT), bypass valve 32 is opened and high pressure air (charge air) circulates through the bypass tube and is fed back to the compressor inlet, thereby lowering the amount of air going into the engine intake 14 and the engine cylinders, thus creating rich combustion in the cylinders. The exhaust gases that are fed to the after-treatment devices (that is, LNT 36 in FIG. 1) are fuel rich and contain high thermal mass. Such conditions promote LNT regeneration.

The amount of air flow bled around compressor 24 can be modulated based on a targeted air/fuel ratio. Once regeneration is achieved, bypass valve 32 is closed and the engine returns to normal lean operating conditions. Engine fueling and timing adjustments may be made during the regeneration phase to maintain the torque at the same level as under normal lean operating conditions, resulting in a minimum fuel economy penalty. Under recirculation conditions, the compressor pressure ratio and speed drop and the air mass flow rate displaced by the compressor increases. Those characteristics result in safe compressor operating conditions, as the operating point is moving away from the compressor surge line.

To get air fuel ratios of 14 (in the example), fuel injection strategies will also be employed. The operation and strategy of these fuel injection strategies may vary depending on the implementation as understood by those of ordinary skill in the art of engine control systems.

With continuing reference to FIG. 1, the primary application of this modulated compressor recirculation arrangement is to provide a targeted air/fuel ratio for LNT regeneration. The operation of valve 32 can be electronically controlled by controller 33 based on LNT regeneration needs and engine operating conditions at that time. Bleed modulation, engine fueling and timing strategies can all be optimized to provide the required air/fuel ratio and exhaust temperature for LNT regeneration, while maintaining engine torque for good drivability and minimizing fuel economy impact.

Another application of the invention is the temporary increase of engine exhaust temperature to promote diesel particulate filter regeneration. FIG. 1 illustrates a diesel particulate filter at 34.

Another application of the invention is to increase exhaust temperature to promote faster catalyst light off or to increase exhaust temperature to a level where catalyst efficiency is higher, resulting in overall lower tailpipe emissions. FIG. 1 illustrates a diesel oxidation catalyst at 38.

Yet another application of the invention is the optimization of turbocharger operation, by either moving the compressor operation away from the surge line (safety feature), or bringing it to a higher efficiency line (performance feature).

Figure 2:
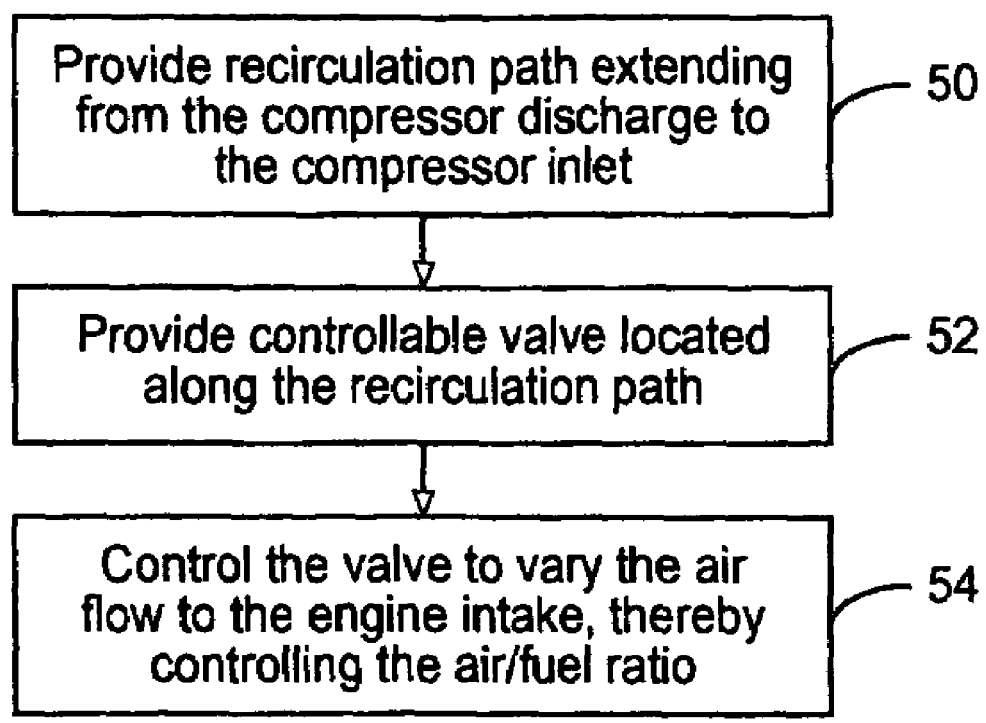
FIG. 2 illustrates a method of the invention in the preferred embodiment.

FIG. 2 illustrates a method of the invention in the preferred embodiment. According to the method for controlling engine air/fuel ratio, a recirculation path extending from the compressor discharge to the compressor inlet is provided (block 50). A controllable valve is provided at a location along the recirculation path (block 52). According to the method, the valve is controlled to vary the air flow to the engine intake, thereby controlling the air/fuel ratio (block 54). The method may be utilized for a variety of different applications.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling engine air/fuel ratio wherein an engine includes a plurality of cylinders fed by fuel injectors, an intake, and an exhaust, a compressor has an inlet receiving air, the compressor discharging air to the engine intake, the method comprising:

providing a recirculation path extending from the compressor discharge to the compressor inlet, wherein a controllable valve is located along the recirculation path;

controlling the valve to vary the air flow to the engine intake, thereby controlling the air/fuel ratio;

wherein a lean NOx trap receives the engine exhaust, the lean NOx trap requiring a rich fuel mixture for regeneration; and periodically regenerating the lean NOx trap by controlling the valve to reduce the air/fuel ratio.

2. A method for controlling engine air/fuel ratio wherein an engine includes a plurality of cylinders fed by fuel injectors, an intake, and an exhaust, a compressor has an inlet receiving air, the compressor discharging air to the engine intake, the method comprising:

providing a recirculation path extending from the compressor discharge to the compressor inlet, wherein a controllable valve is located along the recirculation path;

controlling the valve to vary the air flow to the engine intake, thereby controlling the air/fuel ratio;

wherein a diesel particulate filter receives the engine exhaust, the diesel particulate filter requiring a high temperature for regeneration; and periodically regenerating the diesel particulate filter by controlling the valve to reduce the air/fuel ratio, thereby increasing exhaust temperature.

3. A method for controlling engine air/fuel ratio wherein an engine includes a plurality of cylinders fed by fuel injectors, an intake, and an exhaust, a compressor has an inlet receiving air, the compressor discharging air to the engine intake, the method comprising:

providing a recirculation path extending from the compressor discharge to the compressor inlet, wherein a controllable valve is located along the recirculation path;

controlling the valve to vary the air flow to the engine intake, thereby controlling the air/fuel ratio;

wherein a diesel oxidation catalyst receives the engine exhaust; and controlling the valve to reduce air/fuel ratio, thereby increasing exhaust temperature and affecting the diesel oxidation catalyst.

4. The method of claim 3 wherein the valve is controlled so as to increase exhaust temperature for more rapid catalyst light off.

5. The method of claim 3 wherein the valve is controlled so as to increase exhaust temperature to a range where catalyst efficiency is higher.

6. A system for controlling engine air/fuel ratio, the system comprising:
- an engine including a plurality of cylinders fed by fuel injectors, an intake, and an exhaust;
- a compressor having an inlet receiving air, the compressor discharging air to the engine intake;
- a recirculation path from the compressor discharge to the compressor inlet;
- a controllable valve along the recirculation path;
- a controller programmed to control the valve to vary the air flow to the engine intake, thereby controlling the air/fuel ratio;
- a lean NOx trap receiving the engine exhaust, the lean NOx trap requiring a rich fuel mixture for regeneration; and
- wherein the controller is programmed to periodically regenerate the lean NOx trap by controlling the valve to reduce the air/fuel ratio.

7. A system for controlling engine air/fuel ratio, the system comprising:
- an engine including a plurality of cylinders fed by fuel injectors, an intake, and an exhaust;
- a compressor having an inlet receiving air, the compressor discharging air to the engine intake;
- a recirculation path from the compressor discharge to the compressor inlet;
- a controllable valve along the recirculation path;
- a controller programmed to control the valve to vary the air flow to the engine intake, thereby controlling the air/fuel ratio;
- a diesel particulate filter receiving the engine exhaust, the diesel particulate filter requiring a high temperature for regeneration; and
- wherein the controller is programmed to periodically regenerate the diesel particulate filter by controlling the valve to reduce the air/fuel ratio, thereby increasing exhaust temperature.

8. A system for controlling engine air/fuel ratio, the system comprising:
- an engine including a plurality of cylinders fed by fuel injectors, an intake, and an exhaust;
- a compressor having an inlet receiving air, the compressor discharging air to the engine intake;
- a recirculation path from the compressor discharge to the compressor inlet;
- a controllable valve along the recirculation path;
- a controller programmed to control the valve to vary the air flow to the engine intake, thereby controlling the air/fuel ratio;
- a diesel oxidation catalyst receiving the engine exhaust; and
- wherein the controller is programmed to control the valve to reduce air/fuel ratio, thereby increasing exhaust temperature and affecting the diesel oxidation catalyst.

9. The system of claim 8 wherein the valve is controlled so as to increase exhaust temperature for more rapid catalyst light off.

10. The system of claim 8 wherein the valve is controlled so as to increase exhaust temperature to a range where catalyst efficiency is higher.

* * * * *